United States Patent
Handgraetinger et al.

(10) Patent No.: US 9,614,238 B2
(45) Date of Patent: Apr. 4, 2017

(54) FUEL CELL SYSTEM

(75) Inventors: Markus Handgraetinger, Ehingen/Donau (DE); Armin Muetschele, Weilheim an der Teck (DE); Holger Richter, Kirchheim (DE); Miriam Runde, Pfinztal-Woeschbach (DE)

(73) Assignee: Daimler AG, Stuttgart (DE)

( * ) Notice: Subject to any disclaimer, the term of this patent is extended or adjusted under 35 U.S.C. 154(b) by 234 days.

(21) Appl. No.: 14/240,121

(22) PCT Filed: Jul. 21, 2012

(86) PCT No.: PCT/EP2012/003092
§ 371 (c)(1),
(2), (4) Date: Apr. 30, 2014

(87) PCT Pub. No.: WO2013/026514
PCT Pub. Date: Feb. 28, 2013

(65) Prior Publication Data
US 2014/0227618 A1    Aug. 14, 2014

(30) Foreign Application Priority Data
Aug. 24, 2011  (DE) .......................... 10 2011 111 742

(51) Int. Cl.
*H01M 8/04119* (2016.01)
*H01M 8/04029* (2016.01)
(Continued)

(52) U.S. Cl.
CPC ... *H01M 8/04141* (2013.01); *H01M 8/04029* (2013.01); *H01M 8/04067* (2013.01);
(Continued)

(58) Field of Classification Search
None
See application file for complete search history.

(56) References Cited

U.S. PATENT DOCUMENTS

| | | | |
|---|---|---|---|
| 6,696,192 B2 | 2/2004 | Kanai et al. | |
| 8,216,728 B2 | 7/2012 | Konrad et al. | |

(Continued)

FOREIGN PATENT DOCUMENTS

| | | |
|---|---|---|
| DE | 101 10 419 A1 | 10/2003 |
| DE | 10 2007 003 144 A1 | 7/2008 |

(Continued)

OTHER PUBLICATIONS

International Search Report dated Oct. 18, 2012 with English translation (seven (7) pages).

(Continued)

*Primary Examiner* — Sarah A Slifka
(74) *Attorney, Agent, or Firm* — Crowell & Moring LLP

(57) ABSTRACT

A fuel cell system includes at least one fuel cell and a humidifying device for humidifying a supply air flow flowing to a cathode chamber of the fuel cell by an exhaust air flow discharged from the cathode chamber of the fuel cell. The supply air flow and the exhaust air flow are separated from one another by water vapor-permeable membranes. An anode water separator, through which exhaust gas from an anode chamber of the fuel cell flows, is integrated into the humidifying device.

13 Claims, 5 Drawing Sheets

(51) Int. Cl.
    *H01M 8/04007*     (2016.01)
    *H01M 8/04111*     (2016.01)
    *H01M 8/04223*     (2016.01)

(52) U.S. Cl.
    CPC .... *H01M 8/04111* (2013.01); *H01M 8/04149* (2013.01); *H01M 8/04164* (2013.01); *H01M 8/04253* (2013.01)

(56) References Cited

U.S. PATENT DOCUMENTS

| | | |
|---|---|---|
| 2002/0139320 A1 | 10/2002 | Shimanuki et al. |
| 2006/0251943 A1 | 11/2006 | Hatoh et al. |
| 2008/0090124 A1 | 4/2008 | Barleben et al. |
| 2009/0098425 A1 | 4/2009 | Kobayashi et al. |
| 2010/0009226 A1* | 1/2010 | Konrad ............ H01M 8/04014 429/415 |

FOREIGN PATENT DOCUMENTS

| | | |
|---|---|---|
| DE | 10 2008 005 649 A1 | 7/2008 |
| WO | WO 2006/056276 A1 | 6/2006 |

OTHER PUBLICATIONS

German-language Written Opinion (PCT/ISA/237) dated Oct. 18, 2012 (eight (8) pages).

* cited by examiner

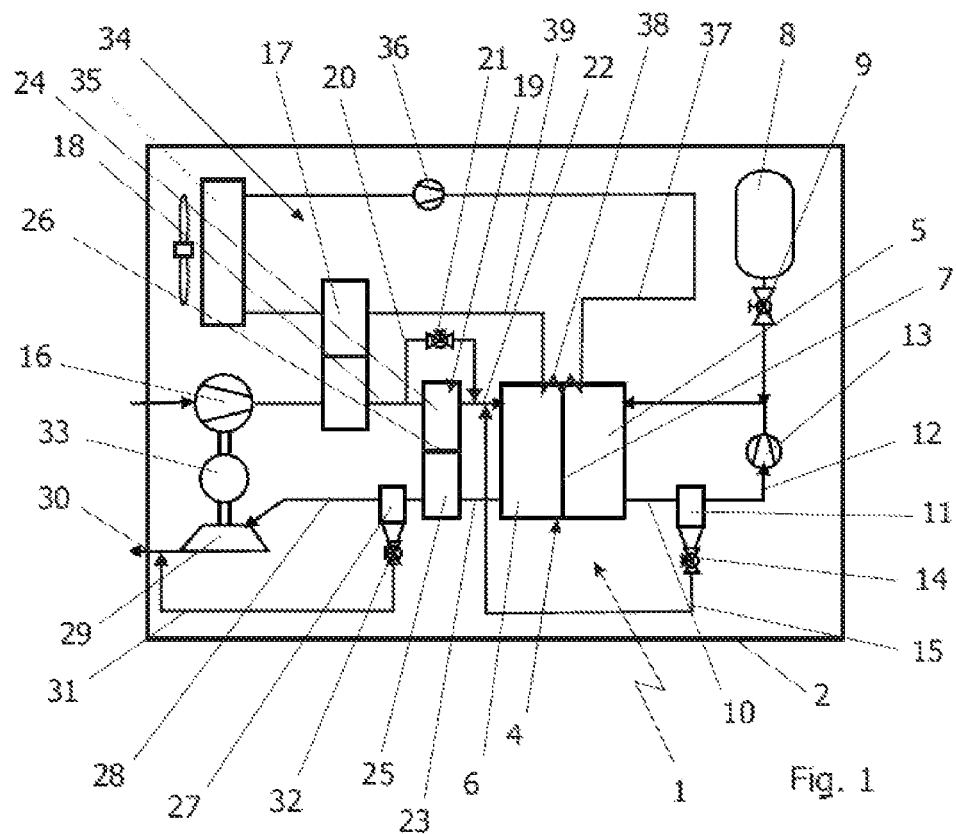
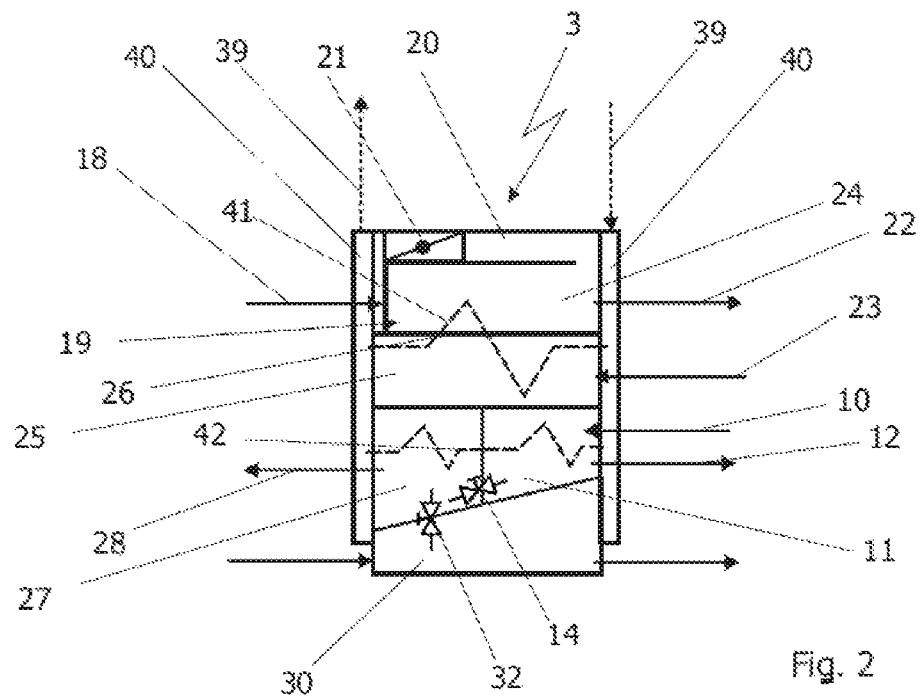
Fig. 1
Fig. 2

FUEL CELL SYSTEM

BACKGROUND AND SUMMARY OF THE INVENTION

Exemplary embodiments of the invention relate to a fuel cell system having at least one fuel cell and a humidifying device.

Fuel cell systems are known from the general prior art. They may be designed on the as a proton exchange membrane (PEM) fuel cell, for example, and may generate electrical power from hydrogen or a hydrogen-containing gas and atmospheric oxygen. This electrical power may then be used for various purposes. One preferred use of fuel cell systems of this type is in vehicles for generating electrical drive power.

Such fuel cell systems typically have humidifiers by means of which in general a supply air flow to a cathode chamber of the fuel cell is humidified to keep the comparatively sensitive membranes of the PEM fuel cell from drying out and to ensure their long-term functionality. Such a humidifier is discussed in German patent document DE 101 10 419 A1, for example. In addition to the humidifier itself, the system has a water separator by means of which water may be collected and injected as auxiliary humidification into the supply air flow.

A particular design concerning the specific arrangement of the humidifier and the water separator with respect to one another is also described in German patent document DE 10 2008 005 649 A1.

Furthermore, DE 10 2007 003 144 A1 discloses a design in which there is functional integration of humidification and cooling in a single component.

Operation of a fuel cell system always results in product water, which must be discharged from the system to ensure the gas supply and thus the functionality of the fuel cell. This water may be additionally used for humidifying the supply air by means of the above-described humidifier. In particular for so-called freezing starts, i.e., starting the fuel cell system at temperatures below the freezing point, and during warm-up of the fuel cell system that is associated with considerable equipment outlay, possible blockages from liquid water, in particular in frozen form, must be avoided. The design typically includes electrical heating of, for example, drainage lines downstream from water separators and/or valves situated in these lines. In addition to the significant energy expenditure, the design as well as the control necessary for this purpose entail additional costs and increase the complexity and therefore the susceptibility to malfunction of the fuel cell system. This is a major drawback, in particular for fuel cell systems which are to be used in vehicles for providing electrical drive power. However, since these systems are frequently switched off under temperature conditions in which freezing of the system is possible before restarting, this equipment design has thus far been unavoidable.

Exemplary embodiments of the present invention avoid or greatly simplify this equipment design, and thus provide a cost-effective and energy-efficient fuel cell system.

In the fuel cell system according to the invention, the humidifying device has an integrated anode water separator, through which exhaust gas from the anode chamber of the fuel cell flows, for humidifying the supply air flow with the moisture contained in the exhaust air flow. This integration of the anode water separator into the humidifying device, through which volume flows from the cathode side otherwise pass, allows advantages with regard to installation space and weight. In addition, in the fuel cell system according to the invention a simple integrated design is made possible in which water separated in the anode water separator may be easily discharged into one of the gas flows from or to the cathode chamber of the fuel cell, since these gas flows likewise pass through the integrated humidifying device. Additional lines for such water that would have to be appropriately heated and/or insulated may be dispensed with.

In another particularly favorable and advantageous embodiment of the fuel cell system according to the invention, a cathode water separator for the exhaust air flow is integrated into the humidifying device. Such a cathode water separator may be particularly advantageous when the exhaust air flow downstream from the humidifying device passes into a turbine or a expander, for example, where typically no droplets are supposed to arrive, since they could easily damage a turbine running at extremely high speed, for example. In addition, in the event of freezing, while the system is switched off this could result in blockage of the expander or the turbine, thus greatly slowing down the restarting process. Thus, according to this meaningful and advantageous embodiment, in addition to the anode water separator the cathode water separator may also have a design that is integrated into the humidifying device. Here as well, complicated lines to be heated electrically and/or insulated, for example, for water discharge may be dispensed with. Furthermore, it is possible to connect the anode water separator to the cathode water separator, so that, for example, the water may be discharged from the fuel cell system via a single shared exhaust line.

In another advantageous embodiment of the fuel cell system according to the invention at least one heat exchanger, through which a cooling medium of a cooling circuit of the fuel cell flows, has a design that is integrated into the humidifying device. Such a heat exchanger, or for example also two heat exchangers through which flow passes in parallel, which is/are associated with the actual humidifier and the water separator(s) according to the above-described embodiment, allow(s) rapid heating and rapid thawing of the humidifying device as needed, for example during a freezing start. The anode water separator and optionally the cathode water separator as well as the actual humidifier may thus be rapidly thawed and brought to operating temperature. Electric heaters may thus be dispensed with. Via the connection to the cooling circuit, it is also possible to delay the cooling of the humidifying device, so that the humidifying device is able to discharge separated water to the surroundings of the fuel cell system for a very long period of time.

In another favorable and advantageous variant of the fuel cell system according to the invention, the anode water separator is switchably connected to one or more components of the cathode side via at least one valve unit. Such a valve unit between the anode water separator and a component of the cathode side, for example a cathode water separator, provided that it is present, represents a very simple and efficient way to discharge water and optionally gas within the humidifying device from an anode recirculation into the region of the supply air flow or the exhaust air flow on the cathode side. The design is highly integrated and very compact, and may dispense with lines which would have to be insulated and possibly heated.

In one very advantageous refinement, the anode water separator is switchably connected to one or more components of the cathode side via at least two valve units, one of the valve units branching off in the anode water separator in such a way that primarily a liquid volume flow passes through this valve unit, and the other of the valve units branching off in the anode water separator in such a way that primarily a gaseous volume flow passes through this valve unit. As the result of such a design having two valve units in different areas of the anode water separator, the discharge of liquid and gas (which typically contains residual hydrogen and inert gases), which may have accumulated in an anode circuit may be subdivided in the humidifying device. Thus, the water may be metered to a component on the cathode side that is different from that for the gas. For example, the water may pass into an exhaust air flow or a cathode water separator, while the gas, for example, passes into a supply air flow to the fuel cell in order to render harmless any residual hydrogen at the catalysts of the cathode chamber.

In another very favorable and advantageous embodiment of the fuel cell system according to the invention, the fuel cell and the humidifying device have a design that is integrated to form a structural unit, so that when the valve unit is open, water from the anode water separator is able to flow into the cathode chamber of the fuel cell due to the force of gravity. Such a design may introduce water and gas into the cathode chamber of the fuel cell without the need for lines, since in this advantageous refinement of the fuel cell system the humidifying device and the fuel cell are integrated with one another. The humidifying device is situated above the fuel cell in the direction of the force of gravity in such a way that a valve unit for emptying the anode water separator introduces at least the water and possibly the gas into the region of the cathode chamber of the fuel cell. Here as well, heating or insulation is not necessary, since line elements which connect the components to one another may be largely dispensed with.

BRIEF DESCRIPTION OF THE DRAWING FIGURES

Further advantageous embodiments of the fuel cell system according to the invention result from the rest of the dependent claims, which are also made clear based on the exemplary embodiments, which are described in greater detail below with reference to the figures, which show the following:

FIG. 1 shows a schematically indicated fuel cell system in a vehicle;

FIG. 2 shows a first embodiment of a humidifying device according to the invention;

DETAILED DESCRIPTION

Figure 3:
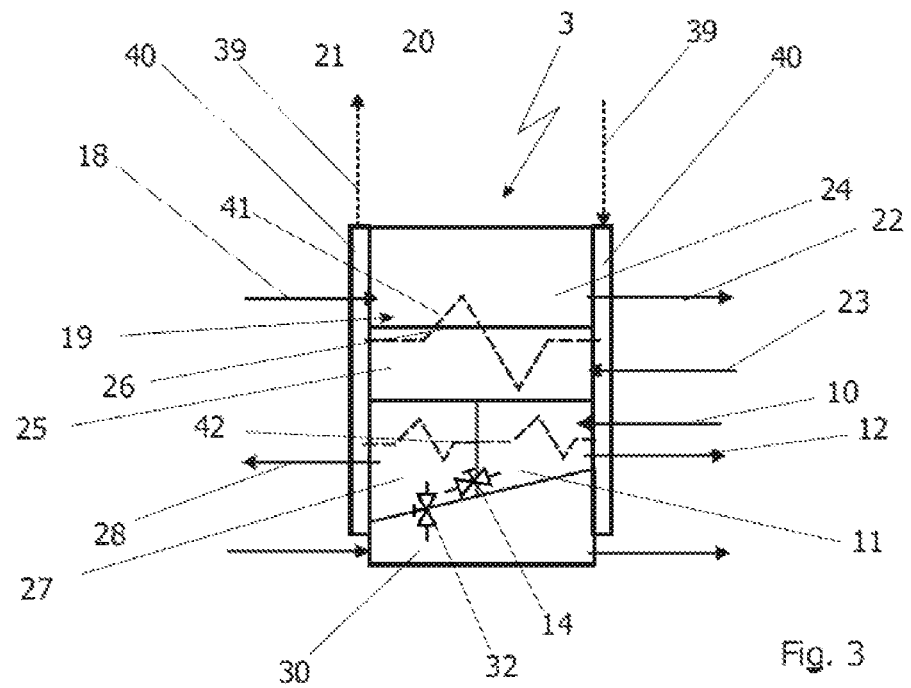
FIG. 3 shows a second embodiment of a humidifying device according to the invention.

The illustration in FIG. 1 shows in highly schematic form a fuel cell system 1 in a schematically indicated vehicle 2. This fuel cell system 1, which is known per se, is explained in greater detail below in order to subsequently be able to discuss the functionality of an integrated humidifying device 3 (not explicitly depicted in the illustration in FIG. 1) in greater detail.

The fuel cell system 1 in the illustration in FIG. 1 has as an essential component a fuel cell 4 which is designed as a stack of PEM fuel cells, a so-called fuel cell stack. The fuel cell 4 includes an anode chamber 5 and a cathode chamber 6. The cathode chamber 5 is separated from the anode chamber 6 by the schematically indicated proton-conductive membranes 7. The anode chamber 5 is supplied with hydrogen as fuel. This hydrogen originates from a compressed gas store 8 and passes to the anode chamber 5 via a schematically indicated valve unit 9, which is designed as a metering valve and/or throttle valve. The hydrogen supplied to the anode chamber 5 is partially reacted in the anode chamber 5. Residual hydrogen together with product water that is formed in the region of the anode chamber 5 and inert gases, in particular nitrogen, which diffuse through the membranes 7 into the anode chamber pass into the anode chamber 5 via an anode outlet 10 to an anode water separator 11, and from there pass via a recirculation line 12 to a recirculation conveying unit 13 that resupplies the residual hydrogen and the inert gases in the exhaust gas together with fresh hydrogen from the compressed gas store 8 to the anode chamber 5. This design, also known as anode recirculation, allows ideal utilization of the available active surface area in the anode chamber 5 due to the excess hydrogen metered into the anode chamber 5. Over time, product water and inert gas then become concentrated in the anode recirculation, and water and/or inert gases must be occasionally discharged to prevent the hydrogen concentration from falling below a critical limit value. This is achieved via the anode water separator 11 and a valve unit 14 situated therein. This valve is also referred to as a drain/purge valve. In the exemplary embodiment illustrated here, the discharged liquid and the discharged gas pass via a discharge line 15 into a supply air flow, which flows to the cathode chamber 6 of the fuel cell 4. Separate discharge of water (drain) and gas (purge) via two different valves would likewise be conceivable.

The cathode chamber 6 of the fuel cell 4 is supplied with air via an air conveying unit 16. The supply air, which is compressed in the region of the air conveying unit 16, passes into a humidifier 19 via an intercooler 17 and a humidifier feed line 18, or is partially or completely diverted around the humidifier 19 via a bypass line 20 having a valve 21. The supply air then passes into the cathode chamber 6 via a cathode feed line 22. Downstream from the cathode chamber 6, the exhaust air flow once again passes into the region of the humidifier 19 via a cathode exhaust line 23. In the humidifier 19, two regions 24, 25 for the supply air flow on the one hand and the exhaust air flow on the other hand are separated from one another by water vapor-permeable membranes 26. The moisture contained in the exhaust air flow thus passes into the supply air flow through these membranes 26 and humidifies the supply air flow. The humidifier 19 is therefore also referred to as a gas-gas humidifier 19. After the flow passes through the region 25 of the humidifier 19, the exhaust air flow passes into the region of a cathode water separator 27 in which liquid is separated from the exhaust air flow. The exhaust air flow then passes into a turbine 29 via a turbine feed line 28, and is expanded in the region of this turbine 29. At least a portion of the pressure energy and thermal energy present in the region of the turbine 29 is thus recovered. The design may additionally include a burner or catalytic burner, not illustrated here, in order to recover further thermal energy from hydrogen or from residual hydrogen that is present in the discharge line 15, for example, which is then likewise supplied to the turbine 29 and used for energy recovery from the fuel cell system 1.

Downstream from the turbine 29, the turbine exhaust air flow passes to the environment via a turbine exhaust air line 30. This turbine exhaust air line 30 may also be supplied with separated water via a further discharge line 31 and a valve unit 32 in the region of the cathode water separator 27. The cathode water separator 27 is used primarily for keeping liquid droplets from the turbine 29, so that damage to the turbine 29, which runs at extremely high speed, cannot occur due to the liquid droplets. In addition, liquid droplets in the region of the turbine 29 could freeze if temperatures below the freezing point result after the fuel cell system 1 or the vehicle 2 is switched off.

In the exemplary embodiment illustrated here, the turbine 29 together with the air conveying unit 16 is situated on a shaft. An electric machine 33 is also present on this shaft. This design is also referred to as an electric turbocharger (ETC). The power generated in the region of the turbine 29 is typically provided to the air conveying unit 16. The remaining power necessary for driving the air conveying unit 16 is provided via the electric machine 33. If more power results in the region of the turbine 29 than is necessary for driving the air conveying unit 16, the electric machine 33 may also be operated as a generator.

The fuel cell system 1 in the schematically indicated vehicle 2 also has a cooling circuit 34. The cooling circuit 34 is depicted here in a highly simplified form in the exemplary embodiment illustrated. The cooling circuit essentially comprises a cooling heat exchanger 35 for discharging excess heat to the environment, a coolant conveying unit 36, and line elements for conducting the liquid cooling medium. The liquid cooling medium is initially led through a heat exchanger 38 in the region of the fuel cell 4 via a fuel cell cooling line 37 in order to discharge excess waste heat here. The cooling medium then passes into the previously mentioned intercooler 17 via a line element 39 in order to cool the hot supply air flow at this location after compression. The cooling medium then passes back into the region of the cooling heat exchanger 35. The cooling power may now be appropriately set, for example via the rotational speed of the coolant conveying unit 36. Of course, in individual situations or operating phases of the fuel cell system 1 it would also be conceivable to completely or partially bypass the cooling heat exchanger 35 or the intercooler 17, for example, via suitable bypass lines and valve units in order to set the desired temperatures.

In addition or as an alternative to cooling by the cooling medium of the cooling circuit 34, the air flow from the region 25 of the humidifier 19 may flow through the intercooler 17 before being discharged from the system. Cooling power may likewise be provided in this way. In systems having a turbine 29, this also results in additional heating of the exhaust air flow, so that more power may be recovered in the region of the turbine 29.

The design described here is known from the general prior art. During operation of the fuel cell system 1, product water results, which is present in the form of water vapor and liquid water in the gas flows on the anode side and cathode side. To prevent freezing or delay it to the greatest possible extent when the fuel cell system 1 in the vehicle 2 is switched off at temperatures below the freezing point, complicated insulation and/or heating, for example electrically heated line elements or the like, are necessary in particular in the region of the humidifier 19 and the anode water separator 11 or the cathode water separator 27. To simplify this equipment design, the previously described humidifying device 3 is proposed below which, depending on the embodiment, combines numerous functionalities in a single integrated component.

A first exemplary embodiment of such a humidifying device 3 is shown in the illustration in FIG. 2. The schematic illustration of the humidifying device 3 shows the gas-gas humidifier 19 with its two regions 24, 25 and the membranes 26 situated in between. The bypass line 20 with the bypass valve 21 is also present in the humidifying device 3. The anode water separator 11 and the cathode water separator 27 are situated beneath the region 25 of the humidifier 19. A portion of the turbine exhaust air line 30 is mechanically connected to this structure of the humidifying device 3. As described above, the dry gas flow now passes into the humidifier 19 via the humidifier feed line 18, and the humidified gas flow is supplied to the cathode chamber 6 via the cathode feed line 22. The moist exhaust air flow as a moisture supplier passes from the cathode chamber 6 via the cathode exhaust line 23 and into the integrated humidifying device 3. After flowing through the region 25 of the humidifier 19, the exhaust air flow passes into the cathode water separator 27, and the exhaust air flow from which liquid water has been removed may flow through the turbine feed line 28 to the turbine 29, not illustrated here. The turbine exhaust air flow passes to the environment via the turbine exhaust air line 30, which in the present case is partially mechanically connected to the integrated humidifying device 3 or is integrated into same.

The anode water separator 11 and the cathode water separator 27 are situated adjacent to one another. In the exemplary embodiment illustrated here, they are connected to one another via the valve unit 14, so that via the valve unit 14 water and/or gas may be discharged from the anode water separator 11, which has been supplied with the water and/or gas via the anode outlet 10, into the region of the cathode water separator 27. Water accumulated in the cathode water separator 27, similarly to the illustration in FIG. 1, may then be discharged into the turbine exhaust air flow via the valve unit 32. As is apparent from the illustration in FIG. 2 by way of example, the design is such that, with the valve unit 14 open, the liquid water flows from the anode water separator 11 due to the force of gravity and into the cathode water separator 27, and from there, with the valve unit 32 open, passes into the turbine exhaust air flow in the turbine exhaust air line 30. Due to the integrated design, line elements between the individual components may be dispensed with. Accordingly, line elements also cannot freeze or cool, and do not have to be insulated or heated.

The integrated humidifying device 3 is also incorporated into the cooling circuit 34 of the fuel cell system 1. This incorporation into the cooling circuit 34 may occur, for example, in the region of the line elements denoted by reference numeral 39 in FIG. 1. This is represented in the illustration in FIG. 2 as a dashed line element 39. Corresponding collectors 40 are connected to the cooling circuit 34 via the line element 39. In the exemplary embodiment illustrated here, two heat exchangers 41, 42, likewise illustrated in dashed lines, through which flow passes in parallel are situated between the two collectors 40. The first heat exchanger 41 incorporates the humidifier 19 of the integrated humidifying device 3 into the cooling circuit 34, and the other heat exchanger 42, which is divided into two subsections through which flow passes in series, incorporates the two water separators 11, 27 of the anode and cathode, respectively, into the cooling circuit 34. This connection of the two water separators 11, 27 via the heat exchanger 42 in parallel with the humidifier 19 into the cooling circuit 34 of the fuel cell via the heat exchanger 41 on the one hand allows rapid thawing of the individual sections of the integrated humidifying device 3 in the event of a freezing start, in order to reduce the warm-up time of in particular the humidifier 19 to operating temperature. On the other hand, in addition to this warm-up via the cooling water in the event of a freezing start, the connection to the cooling water is also advantageous in that the integrated humidifying device 3 cools down comparatively slowly when the fuel cell system 1 is switched off, in particular when the cooling circuit 34 continues to operate. This is also assisted by the comparatively large mass of the integrated humidifying device 3 compared to its individual components. In this way, liquid water may be kept liquid for a very long time and discharged from the fuel cell system 1.

In addition to the discharge of the liquid water into the turbine exhaust air flow via the valve unit 32, the exhaust air itself, typically together with the residual hydrogen discharged into the exhaust air from the anode chamber 5 via the valve unit 14, flows to the turbine 29 via the turbine feed line 28. As previously mentioned, a burner or a catalytic burner may be situated in the region of the turbine feed line 28. Residual oxygen and residual hydrogen in the gas flow passing to the turbine 29 would then be reacted with one another in this burner. As a result, hydrogen emissions to the environment are prevented, and the thermal energy generated during the catalytic combustion increases the power output at the turbine 29.

The illustration in FIG. 3 shows the integrated humidifying device 3 in one alternative embodiment. The design essentially corresponds to the design described for FIG. 2. In the present case, however, the bypass line 20 and the bypass valve 21 have been dispensed with. Regulation of the humidification can thus no longer be achieved via the bypass, and instead the adjustment must be made via other mechanisms, such as the air stoichiometry. The design thus spares installation space, weight, and individual components.

Figure 4:
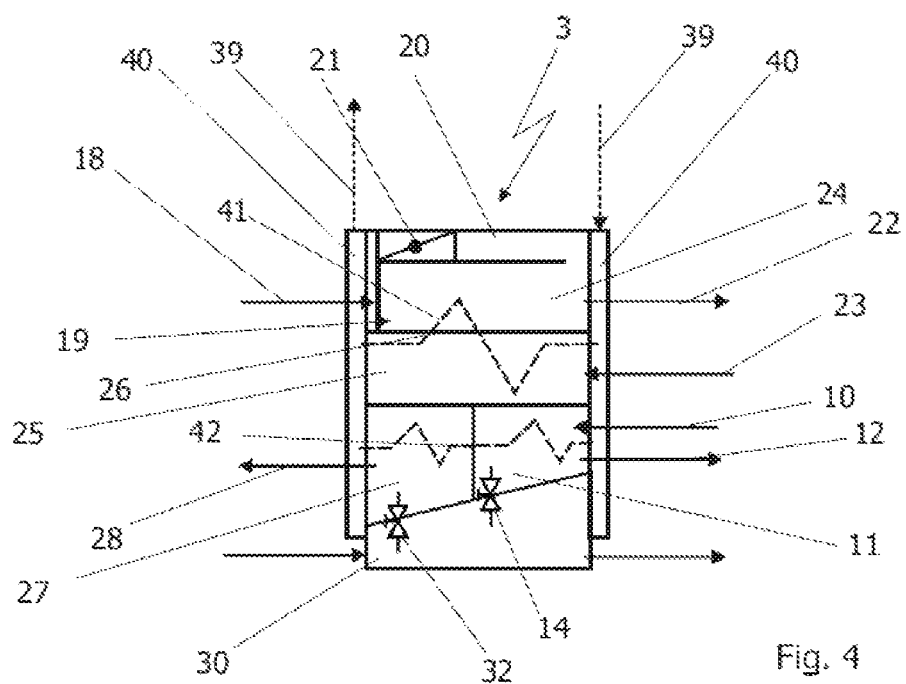
FIG. 4 shows a third embodiment of a humidifying device according to the invention.

The illustration in FIG. 4 shows another alternative embodiment of the integrated humidifying device 3. The above statements basically apply here, and in particular the integrated humidifying device essentially has the design of the integrated humidifying device 3 illustrated in FIG. 2. The sole difference is that the valve unit 14 no longer leads from the anode water separator 11 into the cathode water separator 27, but, rather, leads directly into the turbine exhaust air line 30. The advantage here is the option of providing the cathode water separator 27 with a much smaller design, thus sparing installation space. The disadvantage is that not only water, but also gases from the anode recirculation pass into the turbine exhaust air flow via the valve unit 14, so that hydrogen emissions to the environment may result.

Figure 5:
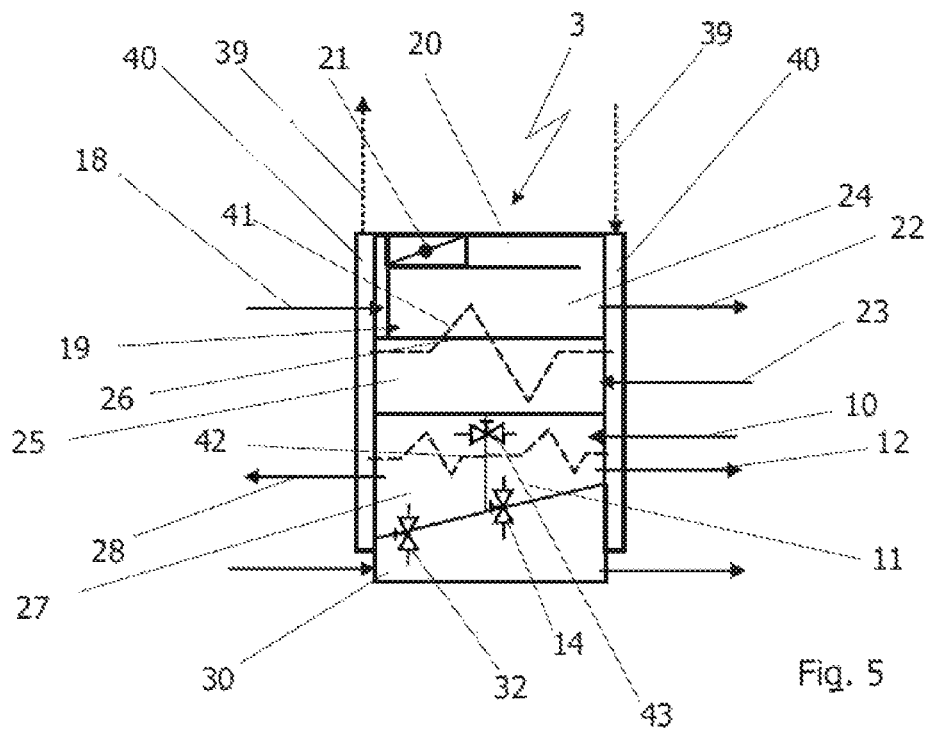
FIG. 5 shows a fourth embodiment of a humidifying device according to the invention.

This is prevented in a further alternative embodiment shown in the illustration in FIG. 5. This embodiment essentially corresponds to a combination of the two embodiments described in FIGS. 2 and 4. The valve unit 14 is once again present in a design analogous to that illustrated in FIG. 4. In this case the valve unit is primarily used to discharge water from the anode water separator 11 into the turbine exhaust air line 30. A further valve unit 43 is situated between the anode water separator 11 and the cathode water separator 27 in such a way that primarily the gas present in the region of the anode water separator 11 may be discharged via this further valve unit into the cathode water separator 27. Here as well, the cathode water separator 27 may be further optimized with regard to installation space, and may be much smaller than in the design according to FIG. 2, since the water from the two separators 11, 27 is separately discharged into the turbine exhaust air line 30. However, the discharged gas is still supplied via the cathode separator 27 to the turbine 29 and typically to a catalytic burner situated upstream therefrom, so that hydrogen emissions may be avoided here, in contrast to the design illustrated in FIG. 4.

Figure 6:
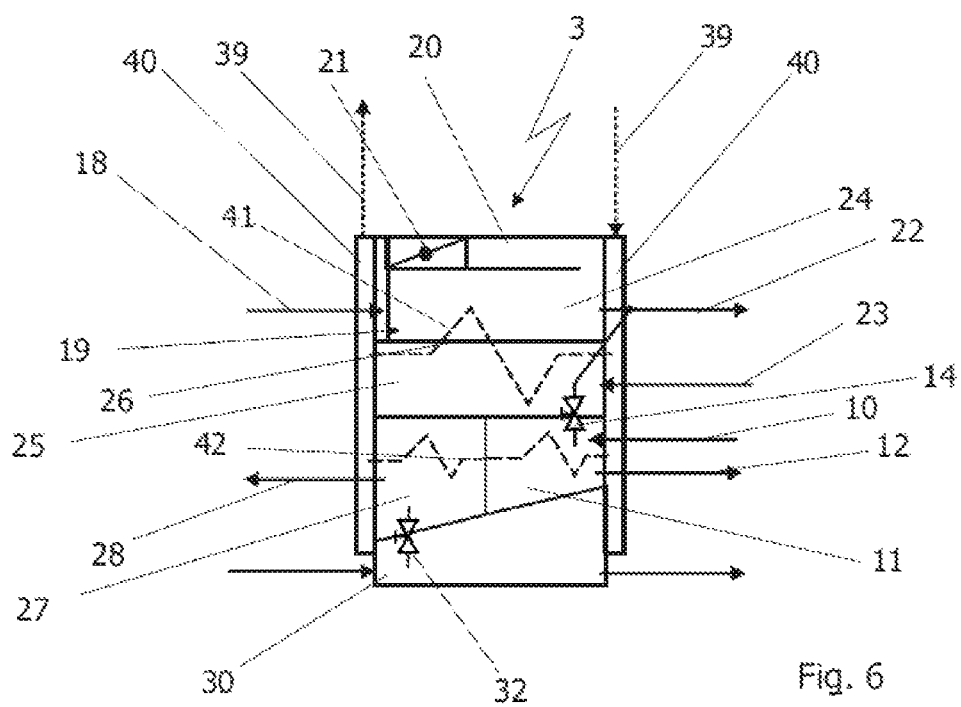
FIG. 6 shows a fifth embodiment of a humidifying device according to the invention.

In the illustration in FIG. 6, the design of the integrated humidifying device 3 is once again understood to be similar to the illustration in FIG. 4. In this case, however, the valve unit 14 does not lead from the anode water separator 11 into the region of the turbine exhaust air line 30, but instead leads into the region of the cathode feed line 22, so that water and gas are led into the cathode chamber 6. Unlike in the selected schematic illustration in FIG. 6, it may be advantageous to select the design in such a way that the water runs through the valve unit 14 in the direction of the cathode feed line 22 due to the force of gravity.

Figure 7:
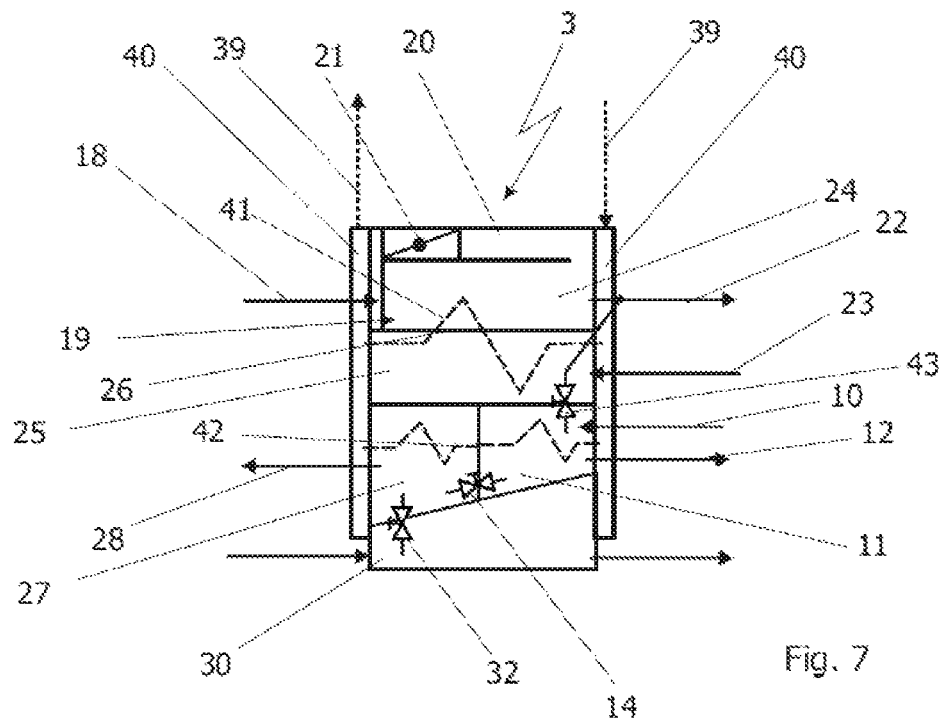
FIG. 7 shows a sixth embodiment of a humidifying device according to the invention.

In the illustration in FIG. 7, this design is once again used, and is supplemented by the previously described valve unit 43. Similarly once again as for the description with regard to FIG. 5, the gas which has accumulated in the anode water separator is now discharged into the cathode feed line 22 via the valve unit, denoted here by reference numeral 43, which connects the anode water separator 11 to the cathode feed line 22. At the same time, by way of example, the valve unit 14 is once again illustrated as a connection between the anode water separator 11 and the cathode water separator 27, and is to be used primarily for discharging water accumulated in the anode water separator 11 into the cathode water separator 27, similarly as for the description with regard to FIG. 2. Alternatively, of course, it would also be conceivable to once again situate the valve unit 14 similarly as for the description with regard to FIG. 5 in such a way that the water is introduced directly into the turbine exhaust air line 30, so that the cathode water separator 27 may be provided with a correspondingly smaller design.

Figure 8:
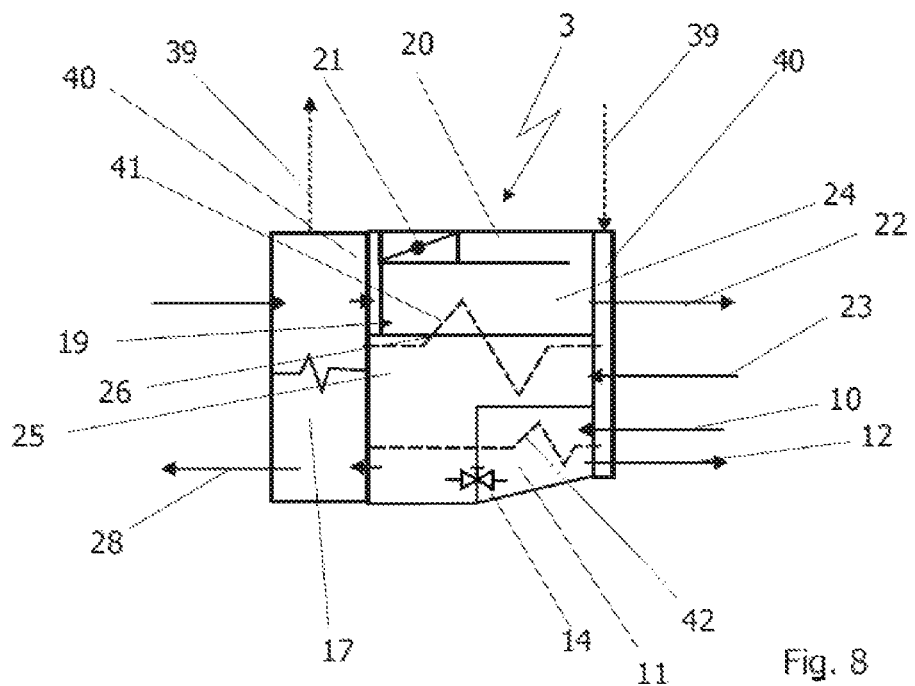
FIG. 8 shows a seventh embodiment of a humidifying device according to the invention.

The illustration in FIG. 8 shows another alternative embodiment of the integrated humidifying device 3. This embodiment dispenses with the cathode water separator 27 altogether, for example due to the fact that the humidifying device 3 is not connected downstream, in the direction of the exhaust air flow, from the turbine, which must be protected from liquid water droplets. As a result, the design is much more compact. The discharging of water and/or gas via the valve unit 14 may be provided directly from the anode water separator 11 into the region 25 of the humidifier 19 or its outlet. The integrated humidifying device 3 in the illustration according to FIG. 8 also has another special feature: an intercooler 17 integrated into the humidifying device 8, and through which cooling medium, which flows through the heat exchangers 41 and 42 of the integrated humidifying device 3, likewise flows. The intercooler 17 is connected to one of the collectors 40 or integrated into same.

Of course, it is conceivable to combine all the described embodiment variants and individual aspects of the designs with one another. Thus, for example, in each of the described variants it would be conceivable to dispense with the bypass line 20 and the valve unit 21 and/or to appropriately integrate the intercooler 17. Of course, all other conceivable combinations are also possible, and may be meaningful with respect to operational management.

Figure 9:
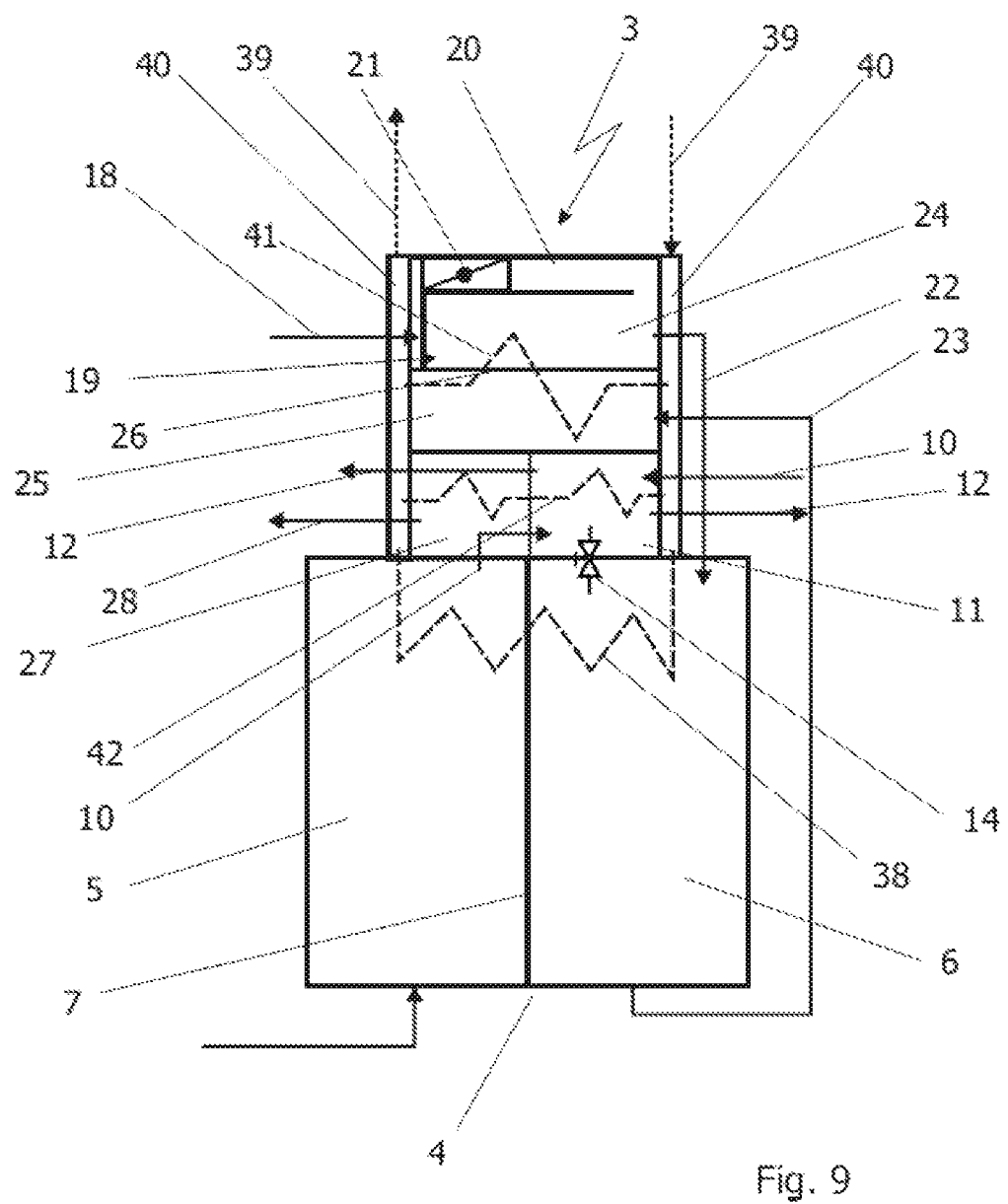
FIG. 9 shows one possible embodiment of the humidifying device with an integrated fuel cell.

The last figure, FIG. 9, once again uses the variant essentially described for FIG. 6. As previously mentioned in the description for FIG. 6, it would be meaningful for the water (and the gas) to be discharged via the valve unit 14 by the force of gravity, so that pressure for discharging the water from the anode water separator 11 is not unnecessarily lost. The illustration in FIG. 9 schematically shows such a design. The integrated humidifying device 3 together with the fuel cell 4 is integrated into a structure, so that the cathode feed line 22 may essentially be dispensed with, and the humidified supply air flow together with water and gas from the anode separator 11 passes directly into the cathode chamber 6 of the fuel cell 4, the water originating from the anode water separator 11 automatically flowing into this region due to the force of gravity. In other respects, the statements made for the previous exemplary embodiments apply here as well. Thus, for example, an integrated design of the fuel cell 4 and the humidifying device 3 may be achieved in the described manner so that, merely as the result of the integrated supply line and dispensing with the cathode feed line 22, only gases are conveyed to the cathode chamber 6 of the fuel cell 4, while the water from the anode water separator 11 once again passes, for example, into the cathode water separator 27 and/or the exhaust air line 30, or directly into the exhaust air flow, via the valve unit 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system, comprising:
   at least one fuel cell;
   a humidifying device having a first region and a second region arranged below the first region, the humidifying device structurally configured to humidify a supply air flow flowing to a cathode chamber of the fuel cell by an exhaust air flow discharged from the cathode chamber of the fuel cell, wherein the first region receives the supply air flow and the second region receives the exhaust air flow and the first and second regions are separated from one another by water vapor-permeable membranes; and
   an anode water separator structurally configured so that exhaust gas from an anode chamber of the fuel cell flows through the anode water separator, wherein the anode water separator is integrated into the humidifying device and arranged below the water vapor-permeable membranes.

2. The fuel cell system according to claim 1, further comprising:
   a cathode water separator structurally configured so that the exhaust air flows through the cathode water separator, wherein the cathode water separator is integrated into the humidifying device.

3. The fuel cell system according to claim 1, further comprising:
   a humidifier bypass line, having a valve unit, integrated into the humidifying device, wherein the humidifier bypass line is structurally configured to bypass a humidifier of the humidifying device.

4. The fuel cell system according to claim 1, further comprising:
   at least one heat exchanger structurally configured so that cooling medium of a cooling circuit of the fuel cell flows through the at least one heat exchanger, wherein the at least one heat exchanger is integrated into the humidifying device.

5. The fuel cell system according to claim 1, further comprising:
   an intercooler for the supply air flow, which is cooled by a cooling medium or the exhaust air flow, wherein the intercooler is integrated into the humidifying device.

6. The fuel cell system according to claim 1, further comprising:
   a turbine which is structurally configured so that it is acted on by the exhaust air flow, wherein a turbine exhaust air line for a turbine exhaust air flow is mechanically connected to the humidifying device or integrated into the humidifying device.

7. The fuel cell system according to claim 1, wherein the anode water separator is structurally configured so that it is switchably connected to one or more components of a cathode side of the fuel cell system via at least one valve unit.

8. The fuel cell system according to claim 1, wherein the anode water separator is structurally configured so that it is switchably connected to one or more components of cathode side of the fuel cell system via at least two valve units, a first one of the two valve units branching off from the anode water separator in such a way that primarily a liquid volume flow passes through the first one of the two valve units, and a second one of the two valve units branching off in the anode water separator in such a way that primarily a gaseous volume flow passes through the second one of the two valve units.

9. The fuel cell system according to claim 2, wherein the anode water separator is structurally configured so that it is switchably connected to the cathode water separator.

10. The fuel cell system according to claim 6, wherein the anode water separator is structurally configured so that it is switchably connected to the turbine exhaust air flow.

11. The fuel cell system according to claim 1, wherein the anode water separator is structurally configured so that it is switchably connected to the supply air flow.

12. The fuel cell system according to claim 7, wherein the fuel cell and the humidifying device are integrated in a manner to form a structural unit, so that when the at least one valve unit is open, water from the anode water separator flows into the cathode chamber of the fuel cell due to the force of gravity.

13. The fuel cell system according to claim 1, wherein the humidifying device is arranged on top of the at least one fuel cell to form a structural unit.

* * * * *